(12) United States Patent
Dittmer et al.

(10) Patent No.: US 10,978,982 B2
(45) Date of Patent: Apr. 13, 2021

(54) METHOD AND DEVICE FOR OPERATING AN ELECTRONICALLY COMMUTATED ELECTRICAL MACHINE IN THE EVENT OF A FAULT

(71) Applicant: Robert Bosch GmbH, Stuttgart (DE)

(72) Inventors: Bernd Dittmer, Ludwigsburg (DE); Ekkehard Hoffmann, Hamburg (DE)

(73) Assignee: Robert Bosch GmbH, Stuttgart (DE)

( * ) Notice: Subject to any disclaimer, the term of this patent is extended or adjusted under 35 U.S.C. 154(b) by 397 days.

(21) Appl. No.: 14/356,186

(22) PCT Filed: Oct. 30, 2012

(86) PCT No.: PCT/EP2012/071430
§ 371 (c)(1),
(2) Date: May 5, 2014

(87) PCT Pub. No.: WO2013/064474
PCT Pub. Date: Oct. 5, 2013

(65) Prior Publication Data
US 2015/0054439 A1 Feb. 26, 2015

(30) Foreign Application Priority Data
Nov. 3, 2011 (DE) ...................... 10 2011 085 657.9

(51) Int. Cl.
*H02P 27/06* (2006.01)
*H02M 1/32* (2007.01)
(Continued)

(52) U.S. Cl.
CPC ............ *H02P 27/06* (2013.01); *B60L 3/0061* (2013.01); *H02M 1/32* (2013.01); *H02P 25/22* (2013.01);
(Continued)

(58) Field of Classification Search
CPC ........ H02P 27/06; H02P 25/22; H02P 29/032; H02M 1/32; B60L 3/0061; B60L 2240/526; Y02T 10/64
(Continued)

(56) References Cited

U.S. PATENT DOCUMENTS 4,954,917 A * 9/1990 Wirth ................. H03K 17/0828
327/546
8,264,190 B2 * 9/2012 Suzuki ................. B62D 5/0403
318/432
(Continued)

FOREIGN PATENT DOCUMENTS

| DE | 29815331 | 9/1999 |
|---|---|---|
| DE | 10223139 | 12/2003 |

(Continued)

OTHER PUBLICATIONS

International Search Report for Application No. PCT/EP2012/071430 dated Sep. 26, 2013 (English Translation, 3 pages).

*Primary Examiner* — Eduardo Colon Santana
*Assistant Examiner* — Devon A Joseph
(74) *Attorney, Agent, or Firm* — Michael Best & Friedrich LLP

(57) ABSTRACT

The invention relates to a method for operating a multiphase electrical machine (2) in the event of a fault, wherein the electrical machine (2) is driven with the aid of a driver circuit (3), wherein the driver circuit (3) has half-bridge circuits (31), each associated with a phase (U, V, W), and bridge paths (32) for connecting or disconnecting predetermined voltage potentials to/from the respective phases (U, V, W) of the electrical machine (2), wherein one or more of the bridge paths (32) are operated according to a first fault operating mode if a fault is detected, wherein, in the first fault operating mode, the one or more bridge paths (32) are controlled in such a manner that said paths connect a first of (Continued)

the predetermined voltage potentials to the phase (U, V, W) via a predetermined electrical resistor.

17 Claims, 3 Drawing Sheets

(51) Int. Cl.
*H02P 25/22* (2006.01)
*H02P 29/032* (2016.01)
*B60L 3/00* (2019.01)

(52) U.S. Cl.
CPC ....... *H02P 29/032* (2016.02); *B60L 2240/526* (2013.01); *Y02T 10/64* (2013.01)

(58) Field of Classification Search
USPC ................ 318/432, 724, 798; 180/65.285
See application file for complete search history.

(56) References Cited

U.S. PATENT DOCUMENTS

| 2004/0257018 A1* | 12/2004 | Tobias | H02P 29/02 318/400.21 |
| 2008/0074819 A1* | 3/2008 | Sasaki | H02M 1/32 361/91.5 |
| 2009/0021207 A1* | 1/2009 | Kezobo | B62D 5/0484 318/798 |
| 2010/0263953 A1* | 10/2010 | Shimana | B60W 10/08 180/65.285 |
| 2011/0074333 A1* | 3/2011 | Suzuki | B62D 5/0484 318/724 |

FOREIGN PATENT DOCUMENTS

| DE | 102010001241 | 10/2010 |
| DE | 102011005973 | 9/2011 |
| EP | 2009782 | 12/2008 |

\* cited by examiner

METHOD AND DEVICE FOR OPERATING AN ELECTRONICALLY COMMUTATED ELECTRICAL MACHINE IN THE EVENT OF A FAULT

BACKGROUND OF THE INVENTION

The present invention relates to electronically commutated electrical machines, in particular multiphase electrical machines that are controlled with the aid of a driver circuit. The invention relates furthermore to features for controlling the electrical machine in the event of a malfunction.

Electronically commutated electrical machines, by way of example for use in electrical drives, are controlled with the aid of a driver circuit (inverter). The driver circuit comprises for this purpose semiconductor switches that switch in an offset manner with respect to one another in accordance with a commutation schedule in order to energize the phase lines of the electrical machine. By way of example, a driver circuit of this type for a three-phase electrical machine can be embodied in the form of a so-called B6 circuit that comprises three half-bridge circuits that comprise in each case two series-connected semiconductor switches. The half-bridge circuits are used to generate in each case a phase voltage. A supply voltage is supplied to the half-bridge circuits and the corresponding phase voltage is tapped at a respective junction between the semiconductor switches of each half-bridge circuit.

It is possible during the operation of the electrical machine for the semiconductor switches to fail, as a consequence of which said semiconductor switches can become permanently closed. This can lead to a high braking torque if a high current flows through the phase winding of one or a multiple of the phase lines of the electrical machine.

Features that are designed to reduce the occurrence of braking torques are known in the prior art. By way of example, additional switches can be installed in the system, such as for example a phase splitter relay or a neutral relay that are opened in the event of a malfunction and prevent the current flow in the phase lines of the electrical machine. However, these features have the disadvantage that as a result of the additionally required components the structural size of the electrical machine is increased. Furthermore, additional ohmic losses occur as a result of the switches and/or relays and said losses can have a limiting effect on the performance. As a result of the additionally required components, the assembly outlay and costs are increased and there is an additional malfunction source that reduces the reliability of the electrical machine.

In the event of a malfunction, e.g. a malfunction in which a low-impedance current path is switched permanently by way of one of the semiconductor switches, it is furthermore possible for all switches in the driver circuit to switch to a particular state and for said switches to remain in this state. As a consequence, it is possible, by way of example, for a three-phase short circuit to occur or for all switches to open.

It is the object of the present invention to provide a method and a device for operating an electrical machine in the event of a malfunction occurring and to render it possible by means of said method and device to avoid any undesirable behavior of the electrical machine, in particular to render it possible to reduce the braking torque and to avoid the disadvantages that arise as a result of providing additional components.

SUMMARY OF THE INVENTION

This object is achieved by virtue of the method for operating an electrical machine according to the invention and also by virtue of the device, the motor system and the computer program product according to the invention.

In accordance with a first aspect of the invention, a method for operating a multiphase electrical machine in the event of a malfunction is provided, wherein the electrical machine is driven with the aid of a driver circuit, wherein the driver circuit comprises half-bridge circuits, which are allocated in each case to a phase, and bridge branches for connecting or disconnecting predefined voltage potentials to and/or from the respective phases of the electrical machine, wherein, if a malfunction is established, one or a multiple of the bridge branches are operated in accordance with a first malfunction operation mode, wherein in the first malfunction operation mode the one or the multiple bridge branches are controlled so that they connect a first predefined voltage potential of the predefined voltage potentials to the phase by way of a defined electrical resistance.

One idea of the above-mentioned method resides in the fact that in the event of a malfunction in which one of the bridge branches of the driver circuit connects a phase permanently to one of the predefined voltage potentials, i.e. said bridge branch is permanently conductive, at least one of the other phases of the electrical machine is connected by way of one of the remaining bridge branches to the same supply potential to which the defective bridge branch is connected, and the relevant bridge circuit is operated in a partially controlled manner so that the resistance of said bridge circuit is increased.

It has been recognized that, in comparison to a phase leakage where there is virtually no resistance, an increase in the resistance in the case of a phase leakage after a malfunction has occurred has the advantage that the braking torque is lower in the case of an identical rotational speed.

In particular, the malfunction can represent a short circuit between two phases, a short circuit of one phase to a voltage potential or a permanently open bridge branch.

It can be provided in accordance with one embodiment that, if it is established as a malfunction that one of the bridge branches is defective and one phase of the electrical machine is permanently connected to the first predefined voltage potential, one or a multiple of the remaining bridge branches that are provided for connecting or disconnecting the remaining phases to and/or from the first predefined voltage potential are operated in a first malfunction operation mode, wherein in the first malfunction operating mode the corresponding bridge branches are controlled so that they connect the first predefined voltage potential to the phase by way of a defined electrical resistance.

It can be provided that the one or the multiple remaining bridge branches that are provided for connecting or disconnecting the remaining phases to and/or from the first predefined voltage potential are operated in the first malfunction operation mode if a rotational speed of the electrical machine is below a predetermined threshold rotational speed.

In the first malfunction operating mode, the remaining bridge branches that are provided for connecting or disconnecting the remaining phases to and/or from a second predefined voltage potential of the predefined voltage potentials are disconnected from the phases.

The one or the multiple bridge branches that are provided for connecting or disconnecting the remaining phases to and/or from the first predefined voltage potential can be operated in a second malfunction operation mode if a rotational speed of the electrical machine is above a predetermined threshold rotational speed, wherein in the second malfunction operation mode the one or the multiple remaining bridge branches are switched to be completely conductive in order to connect the remaining phases to the first predefined voltage potential.

It can be provided that the defined electrical resistance of the one or the multiple bridge branches that are being operated in the first malfunction operation mode is varied in dependence upon the rotational speed and/or in dependence upon a motor current and/or in dependence upon a position of a rotor of the electrical machine.

Furthermore, the one or the multiple remaining bridge branches comprise semiconductor switches that are operated in a partially controlled manner in the first malfunction operation mode in order to form the defined electrical resistance.

Furthermore, the defined electrical resistance can be between the electrical resistance of one of the bridge branches in the case of the first predefined voltage potential being connected to the respective phases of the electrical machine and the electrical resistance of one of the bridge branches in the case of the first predefined voltage potential being disconnected from the respective phases of the electrical machine.

In particular in the first malfunction operation mode, the defined electrical resistance can correspond to a resistance between a half line resistance and a double line resistance of one phase line of the electrical machine.

In accordance with a further aspect of the invention, a device for operating a multiphase electrical machine in the event of a malfunction, wherein the electrical machine is driven with the aid of a driver circuit, wherein the driver circuit comprises half-bridge circuits, which are allocated in each case to a phase, and bridge branches for connecting or disconnecting predefined voltage potentials to and/or from the respective phases of the electrical machine, wherein the device is designed so as, if a malfunction is established, to operate one or a multiple of the bridge branches in accordance with a first malfunction operation mode, wherein the device is furthermore designed so as in the first malfunction operation mode to control the one or the multiple bridge branches so that they connect a first predefined voltage potential of the predefined voltage potentials to the phase by way of a defined electrical resistance.

In accordance with a further aspect of the invention, a motor system is provided that comprises:
 a multiphase electrical machine
 a driver circuit, the half-bridge circuits, which are allocated in each case to a phase of the electrical machine, and bridge branches for connecting or disconnecting predefined voltage potentials to and/or from the respective phases of the electrical machine, and
 the above-mentioned device.

In accordance with a further aspect of the invention, a computer program product is provided that has a program code that performs the above-mentioned method if said program code is implemented on a data processing device.

BRIEF DESCRIPTION OF THE DRAWINGS

Preferred embodiments of the present invention are described in detail hereinunder with reference to the attached drawings, in which.

DETAILED DESCRIPTION

Figure 1:
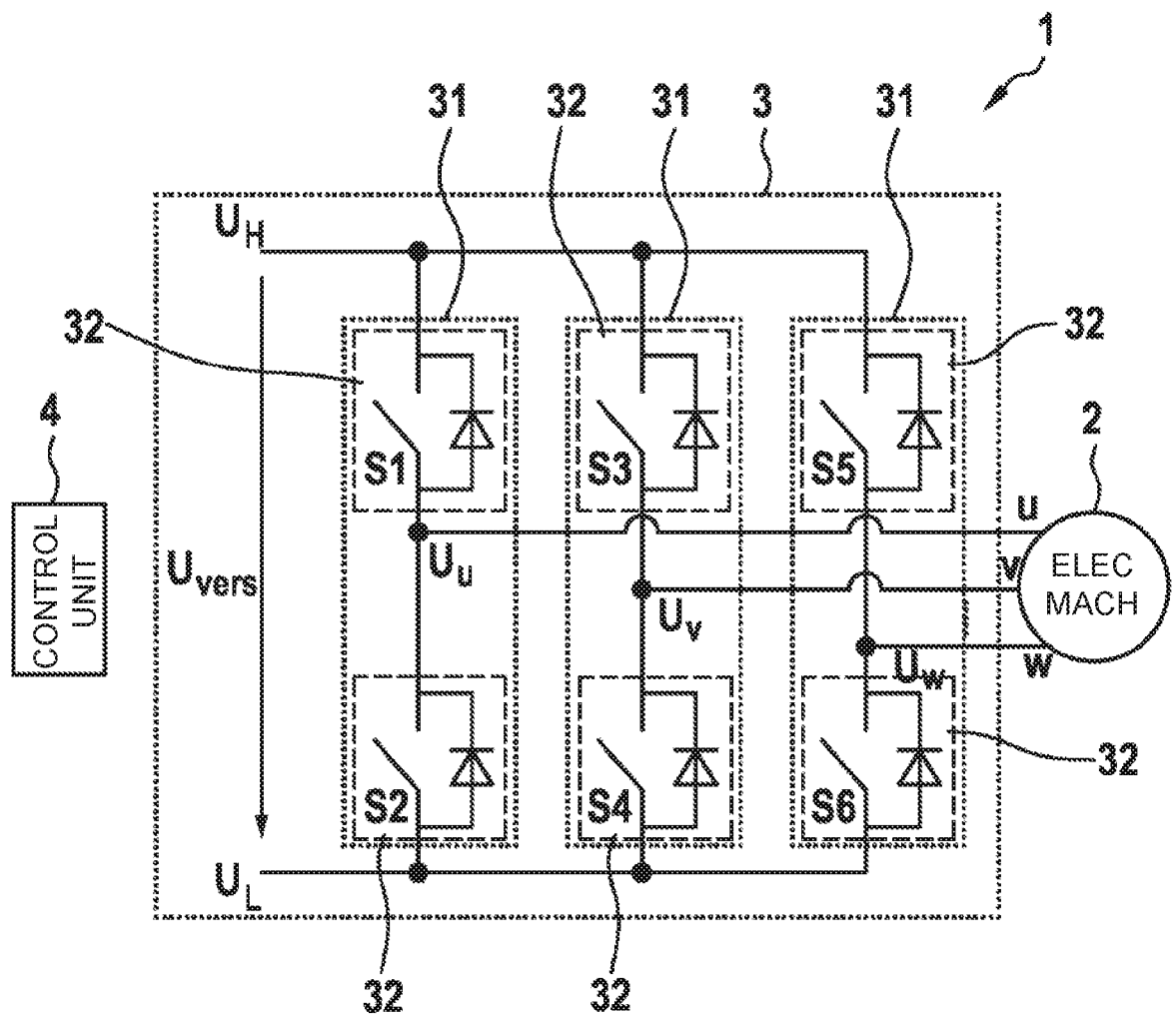
FIG. 1 illustrates a schematic view of a motor system having an electronically commutated electrical machine.

FIG. 1 illustrates a schematic view of a motor system 1 having an electrically commutated electrical machine 2. The electrical machine 2 can be embodied, by way of example, as a synchronous machine, an asynchronous machine, a reluctance machine or the like. The electrical machine 2 is multiphase, three-phase in the illustrated exemplary embodiment, and comprises the phases U, V, W. The electrical machine 2 is electronically commutated, i.e. changeable phase voltages and/or phase currents are supplied in accordance with a commutation schedule to the electrical machine 2 and/or to phase lines of the electrical machine 2.

The phase voltages $U_U$, $U_V$, $U_W$ are generated with the aid of a driver circuit 3 that is controlled by means of a control unit 4. The control unit 4 can be embodied, by way of example, as a microcontroller or the like and provides control signals that can be used to control semiconductor switches S1 to S6 of the driver circuit 3. The semiconductor switches S1 to S6 are preferably provided as power semiconductor switches, such as for example power MOSFETs, thyristors, IGBTs, IGCTs or the like.

The control unit 4 performs the control process in accordance with the commutation schedule that ascertains switching states for the semiconductor switches S1 to S6 in dependence upon information regarding a position of a rotor of the electrical machine 2. The control unit 4 can control the semiconductor switches S1 to S6 in accordance with a pulse width modulation process in order to vary the phase voltage that is to be supplied to the phase lines of the electrical machine 2. As a consequence, it is possible to control the semiconductor switches S1 to S6 in a variable manner using only two signal levels.

The driver circuit 3 is embodied as a so-called B6 circuit in order to provide three phase voltages for supplying to the electrical machine 2. The B6 circuit comprises three half-bridge circuits 31 that are provided between a first high supply potential $V_H$ and a second low supply potential $V_L$ of a supply voltage $U_{Vers}$. Each of the half-bridge circuits 31 comprises a first bridge branch 32 that is connected directly to the high supply potential $V_H$ and comprises a first semiconductor switch S1, S3, S5, and a second bridge branch 32 that is connected directly to the low supply potential $V_L$ and comprises a second semiconductor switch S2, S4, S6. One of the phase voltages is tapped between the mutually connected first and second semiconductor switches S1, S2; S3, S4; S5, S6 of each half-bridge circuit 31 and said phase voltage is supplied to the electrical machine 2.

In the event of a malfunction in which one of the semiconductor switches S1 to S6 is permanently closed, it is generally no longer possible to continue to operate the electrical machine 2. It is important for numerous applications that the electrical machine 2 is in a reliable non-energized state and that the energy that is stored in the phase lines is reduced. Simultaneously, however, the braking torque that is exerted on the electrical machine 2 is to be as low as possible. By way of example, when using an electrical machine in steering mechanisms for vehicles, a feature of this type can be crucial for the safety aspect since an excessively high braking torque could lead to a loss of controllability of the vehicle.

The function is therefore provided whereby each one of the semiconductor switches S1 to S6 is permanently monitored by means of the control unit 4 and a phase leakage is introduced in the event that a malfunction is established in which one of the semiconductors S1 to S6 can no longer be opened and therefore remains permanently in the closed (conductive and/or low-impedance) state. In the event of a phase leakage, those semiconductor switches of the semiconductor switches S1 to S6 that are connected directly to the same supply potential $V_H$, $V_L$ as the defective semiconductor are closed while the remaining semiconductor switches of the semiconductor switches S1 to S6, i.e. the semiconductor switches that are connected directly to the corresponding other supply potentials of the supply potentials $V_H$, $V_L$ are opened, so that the phase lines of the electrical machine 2 are mutually connected in an electrical manner by way of the closed semiconductor switches. Whereas as a consequence, the electrical energy that is stored in the electrical machine 2 can be reduced extremely rapidly, this does, however, lead to a high current flow through the phase lines of the electrical machine 2 and as a consequence counteracts a high braking torque of the movement of the rotor of the electrical machine 2.

In order to reduce the braking torque, it is provided that in the event of a malfunction in which one of the semiconductor switches S1 to S6 is permanently closed at least one of the semiconductor switches S1 to S6 that are connected directly to the same supply potential is operated in a partially controlled manner so that although said semiconductor switches allow a current flow, they do have a resistance so that the voltage that is induced by means of the movement of the rotor can only effect a reduced current flow through the phase lines. As a result, the current flow that is effected by means of the induced voltage can be limited. In addition, the movement of the rotor of the electrical machine 2 counteracts a lower braking torque and as a result the energy that is stored in the phase windings of the electrical machine is reduced more slowly than in the case of a completely low-impedance phase leakage.

In the present exemplary embodiment, it is possible to assume, by way of example, that the semiconductor switch S6 is defective and thus is permanently electrically conductive. This is recognized according to the monitoring process by means of the control unit 4, e.g. by monitoring the voltage drop across the semiconductor switch, and the process of electronically commutating the electrical machine 2 is terminated. Simultaneously, the semiconductor switches S1, S3, S5 that are connected to the other supply potential line than the defective semiconductor switch S6 are opened and the semiconductor switches S2, S4 that are connected to the same supply potential line as the defective semiconductor switch are operated in a partially controlled manner.

The partial control process can be performed depending upon the options of the control unit 4 on the one hand by supplying an intermediate voltage as a control voltage, wherein the current that is flowing through the semiconductor switches S2, S4 can be adjusted by means of selecting the control voltage. As a consequence, an effective resistance is provided by means of the corresponding semiconductor switches S2, S4, said effective resistance being higher than in the case of a full control process.

If the control unit 4 does not provide a process for controlling the semiconductor switches using a control signal that corresponds to an analogue voltage signal, it is thus also possible to provide that the corresponding semiconductor switches that are to be controlled in a partial manner are to be controlled using a pulse width modulation process, wherein the duty cycle of the pulse width modulation process is selected so as to set in the middle a desired through-flow resistance of the corresponding semiconductor switches S2, S4.

It is preferred that the partial control of the semiconductor switches that are to be partially controlled is selected so that said semiconductor switches comprise an effective resistance that lies in a region between the half line resistance and the double line resistance of the phase lines and in particular corresponds to the line resistance. Furthermore, the effective resistance value that is determined by means of the partial control process is limited by means of the thermal loading capacity of the MOSFETs.

Figure 2A:
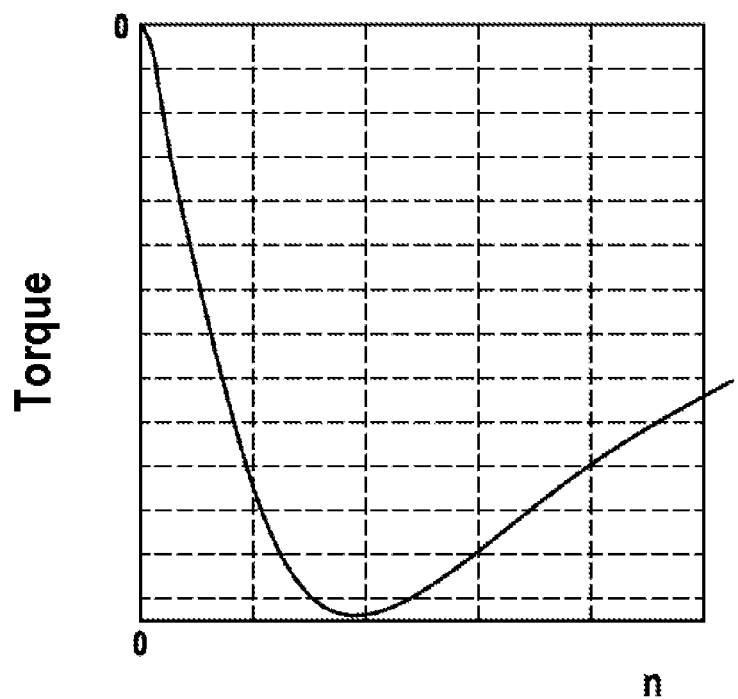
FIGS. 2a-c show a diagram for illustrating the braking torque progression in dependence upon a rotational speed in the case of a three-phase leakage having semiconductor switches that are completely through-connected and in the case of a three-phase leakage in which at least one of the semi-conductor switches is operated in a partially controlled manner.
Figure 2B:
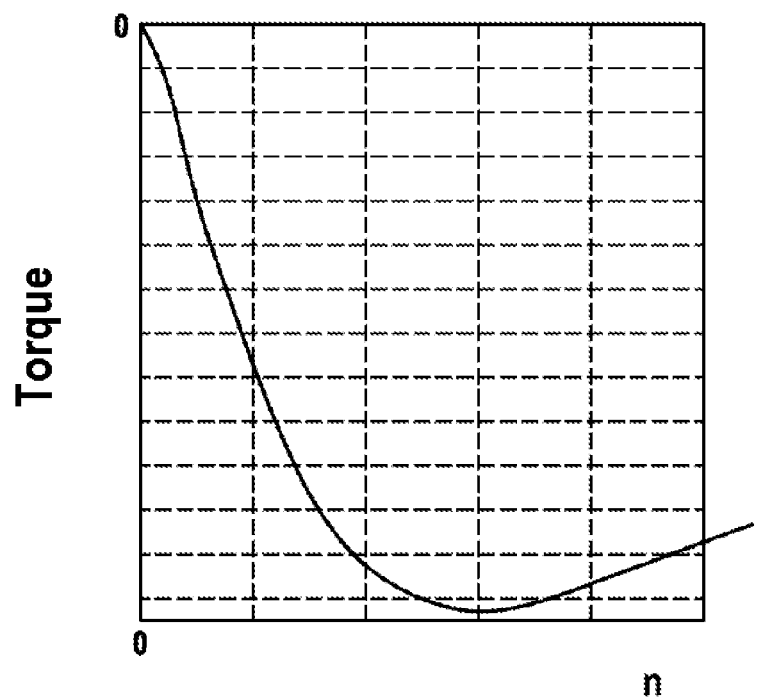

FIGS. 2a and 2b plot the braking torques over the rotational speed of an electrical machine 2, wherein the phase lines of the electrical machine 2 are mutually connected in FIG. 2a by way of a phase leakage, whereas in the case in FIG. 2b the phase lines of the electrical machine 2 are mutually connected by way of semiconductor switches that are only partially controlled, so that an additional resistance is provided between the phase lines. It is evident that the progression in the case of FIG. 2b is displaced in the region of the higher rotational speeds, so that a lower braking torque is set in the case of lower rotational speeds. Furthermore, it is evident that the braking torque also reduces in a range of higher rotational speeds.

Figure 3:
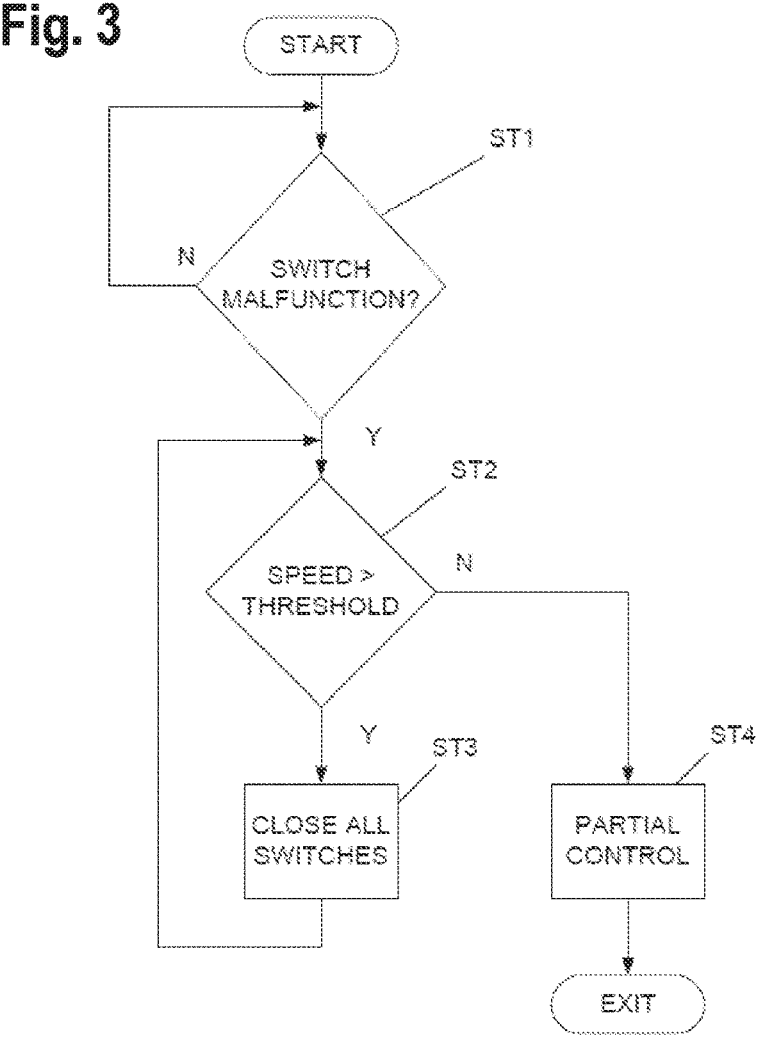
FIG. 3 shows a flow diagram for illustrating a method for operating an electrical machine in the event of a malfunction.

FIG. 3 shows a flow diagram for illustrating a method for operating an electrical machine in the event of a malfunction. If it is established during a query in step ST1 that a malfunction has occurred and in this malfunction one of the semiconductor switches S1 to S6 remains permanently closed despite it being controlled in the opposite manner (alternative: yes), the method moves to step ST2 where the rotational speed n of the electrical machine is checked with respect to a predetermined or calculated threshold rotational speed $n_0$. Otherwise (alternative: no), the method remains in step ST1 waiting for a malfunction to occur.

If it is established in step ST2 that the rotational speed n is greater than the threshold rotational speed $n_0$ (alternative: yes), the method moves to step ST3 where initially the still intact semiconductor switches S1 to S6 are controlled in such a manner that a complete phase leakage is achieved, in that all the semiconductor switches S1, S3, S5 or S2, S4, S6 that are to be closed are completely closed so that they are conductive in a maximum possible manner. The method returns to the query in step ST2.

If it is established in step ST2 that the rotational speed n is lower than or equal to the threshold rotational speed $n_0$ (alternative: no), the method returns in step ST4 to the above-described partially controlled operation of the still intact semiconductor switch.

Figure 2C:
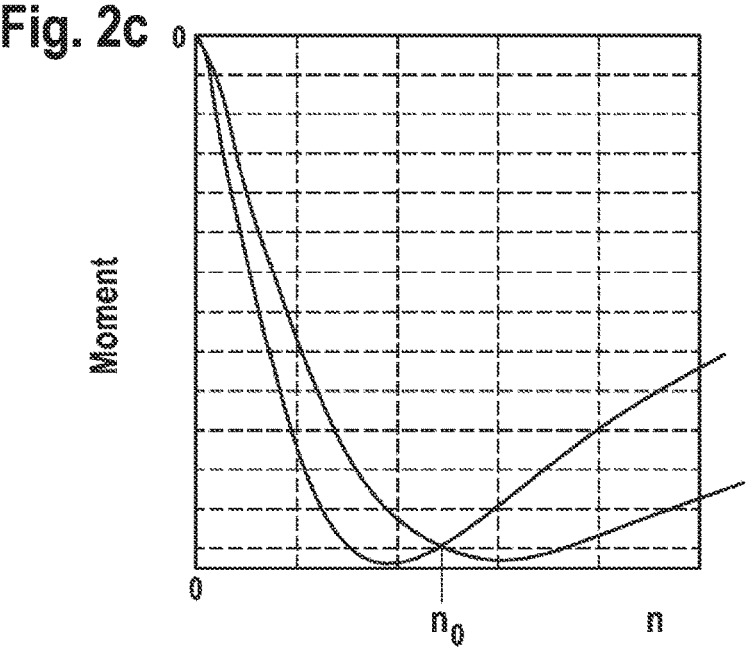

FIG. 2c illustrates the progressions of FIGS. 2a and 2b superimposed one over the other. It is possible using the above-mentioned method to control two operation modes so that the respectively lowest braking torque can be achieved over the entire rotational speed range.

It is naturally also possible to provide different partial control processes of the semiconductor switches that are to be partially controlled, in that multiple effective resistances of the partially controlled semiconductor switches are adjusted by means of a corresponding control process. Said effective resistances can be adjusted in each case in defined rotational speed ranges (in the event that multiple threshold rotational speeds are provided).

It is naturally also possible to provide in a variable manner the partial control of the semiconductor switches that are to be partially controlled, so that the semiconductor switches that are to be partially controlled are adjusted in each case so that a virtually constant braking torque is achieved over a wide rotational speed range.

The invention claimed is:

1. A method for operating a multiphase electrical machine (2) in the event of a malfunction, the method comprising:
    driving the electrical machine (2) with the aid of a driver circuit (3), the driver circuit (3) comprising half-bridge circuits (31),
    allocating each half-bridge circuit (31) to a phase (U, V, W), and
    electrically connecting or disconnecting predefined voltage potentials to and/or from the respective phases (U, V, W) of the electrical machine (2) via bridge branches (32),
    operating one or a multiple of the bridge branches (32) in a first malfunction operation mode when a malfunction is detected, and
    reducing a braking torque of the multiphase electrical machine (2) in the first malfunction operation mode by controlling the one or the multiple bridge branches (32) connected to the same potential as the malfunctioning bridge branch (32) so that they connect a first predefined voltage potential of the predefined voltage potentials to the phase (U, V, W) by way of a predefined electrical resistance;
    wherein the one or the multiple bridge branches (32) comprise semiconductor switches (S1, S2, S3, S4, S5, S6) that are operated in a partially controlled manner, such that the semiconductor switches (51, S2, S3, S4, S5, S6) do not completely close, in the first malfunction operation mode in order to form the predefined electrical resistance.

2. The method as claimed in claim 1, wherein the malfunction corresponds to a short circuit between two of the phases (U, V, W).

3. The method as claimed in claim 1, wherein, if one of the bridge branches (32) is defective and one phase (U, V, W) of the electrical machine (2) is permanently connected to the first predefined voltage potential, one or a multiple of the remaining bridge branches (32) that are provided for connecting or disconnecting the remaining phases (U, V, W) to and/or from the first predefined voltage potential are operated in the first malfunction operation mode,
    wherein, in the first malfunction operation mode, the corresponding bridge branches (32) are controlled so that they connect the first predefined voltage potential to the phase (U, V, W) by way of a defined electrical resistance.

4. The method as claimed in claim 3, wherein the one or the multiple remaining bridge branches (32) that are provided for connecting or disconnecting the remaining phases (U, V, W) to and/or from the first predefined voltage potential are operated in the first malfunction operation mode if a rotational speed of the electrical machine (2) is below a predetermined threshold rotational speed.

5. The method as claimed in claim 4, wherein the one or the multiple bridge branches (32) that are provided for connecting or disconnecting the remaining phases (U, V, W) to and/or from the first predefined voltage potential are operated in a second malfunction operation mode if a rotational speed of the electrical machine (2) is above a predetermined threshold rotational speed, wherein in the second malfunction operation mode the one or the multiple remaining bridge branches (32) are switched to be completely conductive in order to connect the remaining phases to the first predefined voltage potential.

6. The method as claimed in claim 3, wherein in the first malfunction operation mode the remaining bridge branches (32) that are provided for connecting or disconnecting the remaining phases (U, V, W) to and/or from a second voltage potential of the predefined voltage potentials are disconnected from the phases (U, V, W).

7. The method as claimed in claim 1, wherein the defined electrical resistance of the one or the multiple bridge branches (32) that are operated in the first malfunction mode is varied in dependence upon the rotational speed and/or in dependence upon a motor current and/or in dependence upon a position of a rotor of the electrical machine (2).

8. The method as claimed in claim 1, wherein the predefined electrical resistance is between the electrical resistance of one of the bridge branches (32) in the case of the first predefined voltage potential being connected to the respective phases (U, V, W) of the electrical machine (2) and the electrical resistance of one of the bridge branches (32) in the case of the first predefined voltage potential being disconnected from the respective phases (U, V, W) of the electrical machine (2).

9. The method as claimed in claim 8, wherein in the first malfunction operation mode the defined electrical resistance corresponds to a resistance between a half line resistance and a double line resistance of a phase line of the electrical machine (2).

10. A computer program product that has a program code that performs the method as claimed in claim 1 if said program code is implemented on a data processing device.

11. The method as claimed in claim 1, wherein the malfunction corresponds to a short circuit of a phase (U, V, W) to a voltage potential.

12. The method as claimed in claim 1, wherein the malfunction corresponds to a voltage potential or a permanently open bridge branch.

13. The method as claimed in claim 1, wherein the defined electrical resistance of the one or the multiple bridge branches (32) that are operated in the first malfunction mode is varied in dependence upon the rotational speed.

14. The method as claimed in claim 1, wherein the defined electrical resistance of the one or the multiple bridge branches (32) that are operated in the first malfunction mode is varied in dependence upon a motor current.

15. The method as claimed in claim 1, wherein the defined electrical resistance of the one or the multiple bridge branches (32) that are operated in the first malfunction mode is varied in dependence upon a position of a rotor of the electrical machine (2).

16. A device for operating a multiphase electrical machine (2) in the event of a malfunction, the device comprising:
    a driver circuit (3) to aid if the driving of the electrical machine (2) the driver circuit (3) comprising
        half-bridge circuits (31), which are allocated in each case to a phase (U, V, W), and
        bridge branches (32) including semiconductor switches (S1, S2, S3, S4, S5, S6) for electrically connecting or disconnecting predefined voltage potentials to and/or from the respective phases (U, V, W) of the electrical machine (2),
    wherein the device is configured to operate one or a multiple of the bridge branches (32) in accordance with a first malfunction operation mode when a malfunction is detected, wherein the device is configured to control the one or the multiple bridge branches (32), connected to the same potential as the malfunctioning bridge branch (32), in a partially controlled manner such that the semiconductor switches (51, S2, S3, S4, S5, S6) do not completely close so that they connect a first predefined voltage potential of the predefined voltage potentials to the phase by way of a predefined electrical resistance in the first malfunction operation mode such that a braking torque of the multiphase electrical machine (2) is reduced.

17. A motor system comprising:

a multiphase electrical machine (2);

a driver circuit (3), half-bridge circuits (31), which are allocated in each case to a phase of the electrical machine (2), and bridge branches (32) for connecting or disconnecting predefined voltage potentials to and/or from the respective phases (U, V, W) of the electrical machine (2), and a device as claimed in claim 16.

* * * * *